C. F. BIERBACH.
EGG CUP.
APPLICATION FILED APR. 21, 1919.
1,310,112. Patented July 15, 1919.
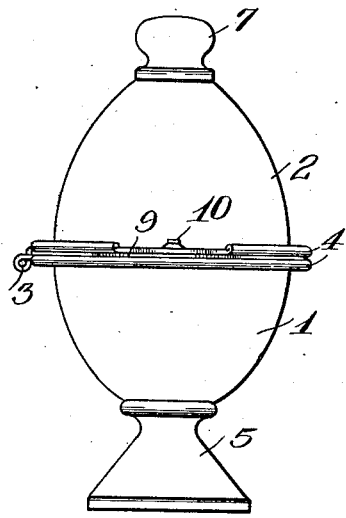
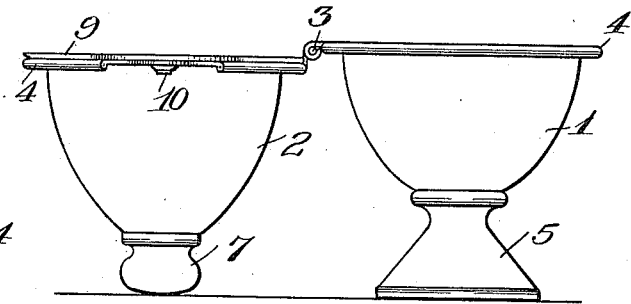
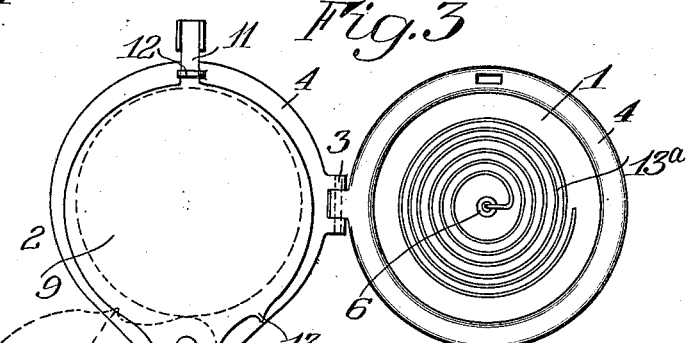
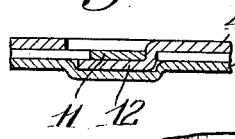
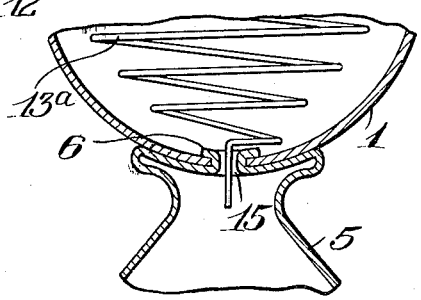
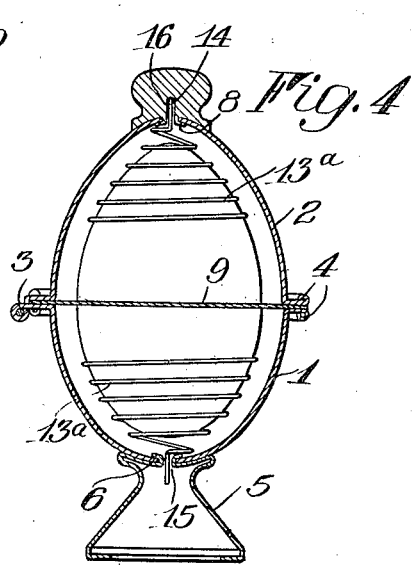
Carl F. Bierbach, INVENTOR
BY Davis & Timms
his ATTORNEYS

UNITED STATES PATENT OFFICE.

CARL F. BIERBACH, OF ROCHESTER, NEW YORK, ASSIGNOR OF ONE-HALF TO OTTILIA GLIEVE, OF ROCHESTER, NEW YORK.

EGG-CUP.

1,310,112.  Specification of Letters Patent.  Patented July 15, 1919.

Application filed April 21, 1919. Serial No. 291,612.

*To all whom it may concern:*

Be it known that I, CARL F. BIERBACH, a citizen of the government of Germany, and resident of Rochester, in the county of Monroe and State of New York, have invented certain new and useful Improvements in Egg-Cups, of which the following is a specification.

The present invention relates to egg cups and more particularly to the type in which the egg is held in two cup shaped members hinged together in such a manner that their cupped sides or faces may be opposed so that an egg severing device may operate between the two members for the purpose of cutting the egg in two parts. An object of this invention is to provide a severing device which will also act as a closure for one of the cupped members in order that, when the uppermost cupped member is swung upwardly from the other or lower cupped member, the uppermost section of the egg will be held within the upwardly swinging member and at the same time any liquid portion of the egg will be prevented from flowing out of the upper egg section, this covering device also acting to retain the heat in the upper section of the egg while the lower section is being eaten. Another object of the invention is to provide springs which will project the separated egg sections above the uppermost edges of the cup shaped members, in order to permit the egg sections to be readily held by the hand, this projecting means being detachably connected with the cup shaped members so that the springs may be readily cleaned.

To these and other ends, the invention consists of certain parts and combinations of parts, all of which will be hereinafter described, the novel features being pointed out in the appended claims.

In the drawings:

Figure 1 is a side view of an egg cup embodying the present invention, the cup being shown with the cup shaped members opposed;

Fig. 2 is a side view showing the egg cup in open position, the cover and severer being closed;

Fig. 3 is a top view of the egg cup in open position, the cover and severer being closed;

Fig. 4 is a vertical section through the egg cup in closed position;

Fig. 5 is a detail view showing the manner of securing the swinging end of the cover to its cup shaped member; and Fig. 6 is a detail view showing the manner of securing the lower spring to its cup shaped member.

Referring more particularly to the drawings 1 indicates the lower cup shaped member and 2 the upper cup shaped member hinged to the lower member at 3. In this instance each of these cup shaped members is formed from a stamped piece of metal and is provided at its cupped side with an outwardly extending flange 4. The lower cup shaped member has a base 5 formed from sheet metal and having a central boss 6 projecting through an opening in the bottom of the cup shaped member and rolled on the inner side of the cup shaped member. The upper cup shaped member has a cap 7 formed with a central boss 8 which is projected through an opening in the top of the cup shaped member 2 and rolled on the inner side of said cup shaped member.

The severing device is in this instance in the form of a disk like member 9 which preferably is pivoted at 10 to the upper cup shaped member 2 and has a diameter sufficient to cover the cupped portion of the member 2. This cover and severer preferably has a finger piece 11 projected from one side thereof and this finger piece 11 may operate beneath a tongue or lip 12 struck up from the flange 4 of the member 2 and acting to limit the movement of the cover 9 in one direction while also holding the cover 9 against lateral movement when in closed position. This cover may also have at one edge adjacent its pivot 10, a projection 13 which is adapted, when the cover is thrown from the dotted line position shown in Fig. 3 and the two cup members are opposed to act, to first penetrate the egg shell so as to facilitate the severing action of the cover 9.

There may be combined with the egg cup, two springs 13ª one for each cup shaped member, each spring being formed spirally to receive one end of an egg and having at the smaller end of the spiral a projecting portion 14. This projecting portion 14 is adapted to pass through the opening 15 formed in the boss 6 or through the opening 16 formed in the boss 8, thus permitting the removal of the springs for the purpose of cleaning said springs. The springs 13ª act to project the egg section slightly above its respective cupped member so that the egg section may be grasped by the fingers while a spoon is being employed for removing the contents of the shell.

In the use of the egg cup, the egg is introduced into the spring of the lower member and the upper member is then swung so that the spring of said member will engage the uppermost end of the egg. The severer and cover 9 is then swung from the dotted line position shown in Fig. 3 to the full line position shown in Fig. 3 after which the uppermost cup is swung to the position shown in Figs. 2 and 3 so that the upper egg section is held within the upper cup shaped member while the lower egg section is held in the lower cup shaped member, the spring of the lower cup shaped member acting to project the lower egg section above the uppermost edge of the lower cup shaped member. After the contents of the lower shell have been consumed, the cover 9 is thrown to the dotted line position shown in Fig. 3 so that the upper section of the egg may be projected above the upper edge of the upper cup shaped member for the removal of the edible contents of such upper egg section. The cover 9 not only tends to hold the contents of the upper shell against discharge when the upper cup like member is swung to the open position, but said covering 9 also serves to retain the heat in the upper egg section while the contents of the lower shell are being eaten. The penetrating point 13 is so positioned that when the cover 9 is in closed position, the projection will lie within the edge of the flanges 4 so as to protect the user of the egg cup against injury.

What I claim as my invention and desire to secure by Letters Patent is:

1. An egg cup comprising a pair of cup shaped members hinged together to permit their cupped sides to become opposed, and a disk shaped cover and severer pivotally connected to one of said members to operate between the members when their cupped sides are opposed, said disk shaped member acting when in one position to completely close the cupped side of the member to which it is pivoted and an overhanging tongue on the member to which the cover and severer is pivoted, said tongue being adapted to receive a portion of the cover and severer thereunder as the latter reaches its closed position to secure said cover and severer to the member to which it is pivoted.

2. An egg cup comprising a pair of cup shaped members hinged together to permit their cupped sides to become opposed, and a disk shaped cover and severer pivotally connected to one of said members to operate between the members when their cupped sides are opposed, said disk shaped member acting when in one position to completely close the cup sides of the member to which it is pivoted, and having adjacent to its pivot on one side a projection arranged to first engage an egg in the two cup members.

3. An egg cup comprising a pair of cup shaped members hinged together to permit their cupped sides to become opposed, the cupped sides having flanges, and a disk shaped cover pivotally connected to the flange of one of said members to operate between the members while their cupped sides are opposed, said disk shaped member acting, when in one position, to completely close the cupped side of the member to which it is pivoted and having adjacent to its pivot on one side a projection arranged to first engage an egg in the two cup shaped members, said projection when the cover is in covering position being entirely protected by the flanges on the cup shaped members.

CARL F. BIERBACH.